United States Patent
Mochizuki et al.

(10) Patent No.: US 6,473,215 B1
(45) Date of Patent: Oct. 29, 2002

(54) OPTICAL SCANNER

(75) Inventors: Takeshi Mochizuki, Ibaraki (JP); Kazutaka Setoma, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/627,044

(22) Filed: Jul. 27, 2000

(30) Foreign Application Priority Data

Sep. 17, 1999 (JP) ............................................. 11-263346
Mar. 24, 2000 (JP) ........................................ 2000-083404

(51) Int. Cl.$^7$ .............................................. G02B 26/08
(52) U.S. Cl. ........................ 359/205; 359/212; 359/216
(58) Field of Search ................................ 359/205–207, 359/216–219, 662

(56) References Cited

U.S. PATENT DOCUMENTS 6,134,040 A * 10/2000 Rim et al. ................... 359/207
6,178,030 B1 * 1/2001 Yamakawa ................... 359/207

* cited by examiner

*Primary Examiner*—James Phan
(74) *Attorney, Agent, or Firm*—Sughrue Mion, PLLC

(57) ABSTRACT

In an optical scanner, while a plurality of lens elements comprise scanning lens optics, the angle ($\theta_{46}$ of the line dropped normal to the first face of a lens element (42) positioned the closest to the medium to be scanned which is directed to a light deflecting means at the point where the principal ray of a light beam incident at the scan start end crosses the first face is generally equal to the angle ($\theta_{46}'$) of the line dropped normal to the second face of the lens element which is directed to the medium to be scanned at the point where the principal ray crosses said second face, and the angle ($\theta_{49}$) of the line dropped normal to the first face at the point where the principal ray of a light beam incident at the scan finishing end crosses said first face is generally equal to the angle ($\theta_{49}'$) of the line dropped normal to said second face at the point where the principal ray crosses the second face.

5 Claims, 5 Drawing Sheets

OPTICAL SCANNER

BACKGROUND OF THE INVENTION

1. Field of the Invention

The present invention relates to an optical scanner for use in image forming apparatus typified by laser printers and copiers.

2. Description of the Related Art

Scanning lens optics in optical scanners have been proposed in various types that are composed of either one or more than one lens element. Known among these is the combination of spherical or aspheric lens optics provided near a light deflecting means and an elongated element such as an elongated cylindrical lens or mirror that has power only in a direction perpendicular to the main scanning direction and which is provided near the medium to be scanned [see, for example, Unexamined Published Japanese Patent Application (kokai) Nos. 230307/1994 and 286106/1996]. The elongated element has two functions, one for making the light deflecting means conjugated with the medium to be scanned so as to reduce the effect of errors in the angle of unintentional deviation by the light deflecting means in the direction perpendicular to the main scanning direction, and the other for reducing the magnification of the scanning lens optics in the direction perpendicular to the main scanning direction so as to suppress the variations in the size of the scanning beam spot on the medium being scanned that are caused by the lens shape and the errors in lens arrangement.

The elongated elements under consideration have no power in the main scanning direction, so they have little effect on the uniformity of the speed at which the light beam moves across the medium to be scanned.

To ensure uniformity in beam moving speed on optical scanners is becoming an increasingly difficult objective as recording media have a higher dot density. To deal with this situation, it has been proposed to improve the uniformity by using an elongated element having power in the main scanning direction (see Unexamined Published Japanese Patent Application Nos. 87123/1986, 106719/1988 and 213740/1998). The elongated elements disclosed in these patents have a deflecting action on the scanning beam irrespective of whether it is at the scan start end or at the finishing end and, hence, the scan width varies depending on the presence or absence of the elongated elements. The term "deflecting action" as used herein means the action by which the angle the emerging ray forms with the optical axis of the scanning lens optics is caused to differ from the angle the incident ray forms with the same optical axis.

FIG. 2 shows an example of the prior art. Indicated by 20 is a rotating polygonal mirror serving as a light deflecting means which is supported to rotate about a shaft in the direction indicated by arrow 25. Indicated by 21 and 22 are two lens elements as scanning lens optics; the lens element 22 is an elongated cylindrical lens having no power in the main scanning direction. Indicated by 23 is a medium to be scanned; 24 is the optical axis of the scanning lens optics; 26 is the principal ray of a light beam at the scan start end; 27 and 28 are the principal rays of a light beam within the scan region; and 29 is the principal ray of a light beam at the scan finishing end. Since the elongated cylindrical lens 22 has no deflecting action in the main scanning direction, the angle each of the rays 26–29 forms with the optical axis 24 on the entrance side satisfies the following relation with the angle on the exit side:

$$\theta i = \theta i' (i=26-29) \quad (1)$$

where $\theta i$ is the incident angle and $\theta i'$ is the exit angle.

Obviously, the elongated cylindrical lens 22 has little effect on the uniformity in the speed at which the light beam moves across the medium being scanned.

FIG. 3 shows another example of the prior art. Indicated by 30 is a rotating polygonal mirror serving as a light deflecting means which is supported to rotate about a shaft in the direction indicated by arrow 35. Indicated by 31 and 32 are two lens elements as scanning lens optics; the lens element 32 is an elongated cylindrical lens having power in both the main scanning direction and a direction perpendicular to it. Indicated by 33 is a medium to be scanned; 34 is the optical axis of the scanning lens optics; 36 is the principal ray of a light beam at the scan start end; 37 and 38 are the principal rays of a light beam within the scan region; and 39 is the principal ray of a light beam at the scan finishing end. Since the elongated cylindrical lens 32 has deflecting action in the main scanning direction, it generally satisfies the following relation:

$$\theta i \neq \theta i' (i=36-39) \quad (2)$$

Since the principal rays 36 and 39 are subject to the deflecting action of the elongated lens 32, the scan width varies depending upon its presence or absence.

SUMMARY OF THE INVENTION

An object, therefore, of the present invention is to provide an optical scanner that meets the requirement for higher dot density in recording media by ensuring that the uniformity in the speed at which a light beam moves across the medium to be scanned is improved without changing the scan width.

The above object of the invention can be attained by an optical scanner comprising a light deflecting means for scanning by deflecting a light beam from a light source and scanning lens optics for focusing the deflected light beam on a medium to be scanned, characterized in that said scanning optics consist of more than one lens element, the angle of the line dropped normal to the first face of the lens element positioned the closest to the medium to be scanned which is directed to the light deflecting means at the point where the principal ray of a light beam incident at the scan start end crosses said first face is generally equal to the angle of the line dropped normal to the second face of said lens element which is directed to the medium to be scanned at the point where said principal ray crosses said second face, and the angle of the line dropped normal to said first face at the point where the principal ray of a light beam incident at the scan finishing end crosses said first face is generally equal to the angle of the line dropped normal to said second face at the point where said principal ray crosses said second face.

DETAILED DESCRIPTION OF THE PREFERRED EMBODIMENTS

Figure 4:
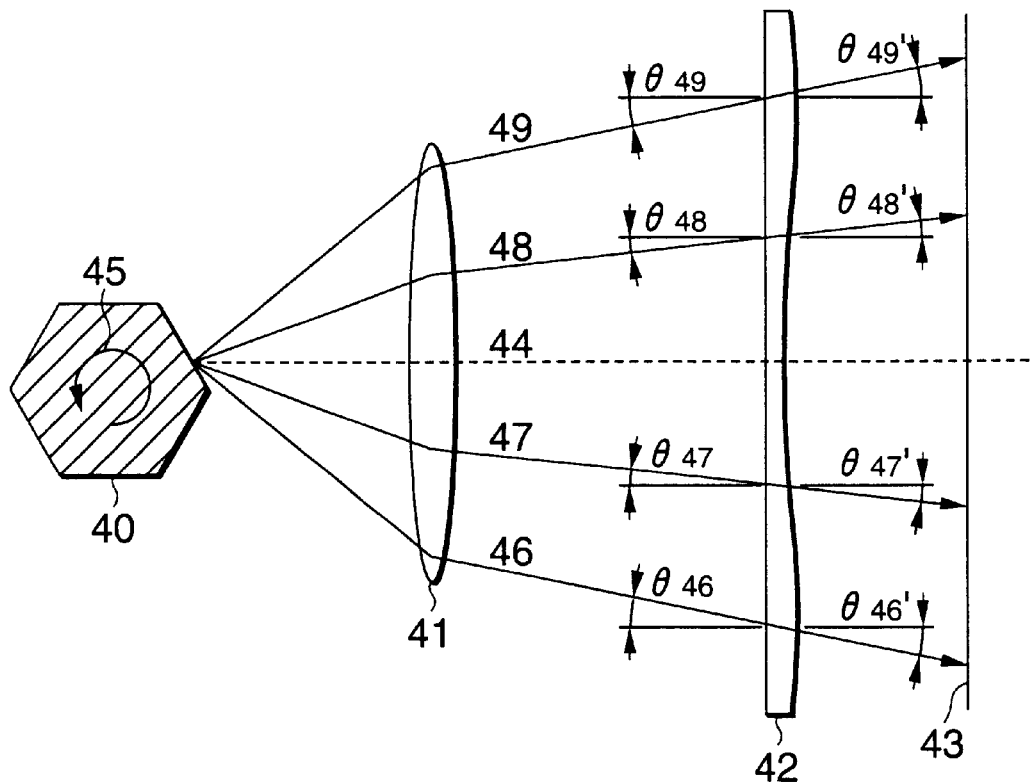
FIG. 4 a schematic of the scanning lens optics in the optical scanner shown in FIG. 1.

We now describe an embodiment of the invention with reference to accompanying drawings. First, the operating principle of the invention is described with reference to FIG. 4. Indicated by 40 is a rotating polygonal mirror serving as a light deflecting means which is supported to rotate about a shaft in the direction indicated by arrow 45. Indicated by 41 and 42 are two lens elements as scanning lens optics; the lens element 42 is an elongated cylindrical lens having power in both the main scanning direction and the direction perpendicular to it. Indicated by 43 is a medium to be scanned; 44 is the optical axis of the scanning lens optics; 46 is the principal ray of a light beam at the scan start end; 47 and 48 are the principal rays of a light beam within the scan region; and 49 is the principal ray of a light beam at the scan finishing end.

In order to ensure that neither the principal ray 46 of a light beam at the scan start end nor the principal ray 49 of a light beam at the scan finishing end is deflected in the main scanning direction, the angle of the line dropped normal to the entrance face of the elongated lens 42 at the point where either ray is incident is designed to be generally equal to the angle of the line dropped normal to the exit face of the same lens at the point where said ray emerges and this relationship is expressed by:

$$\theta i = \theta i'(i=46, 49) \qquad (3)$$

On the other hand, in order to ensure that both the principal rays 47 and 48 within the scan region are subjected to a suitable degree of deflection in the main scanning direction, the angle of the line dropped normal to the entrance face of the elongated lens 42 at the point where either ray is incident is designed not to be equal to the angle of the line dropped normal to the exit face of the same lens at the point where said ray emerges and this relationship is expressed by:

$$\theta i \neq \theta i'(i=47, 48) \qquad (4)$$

Therefore, by using the elongated lens 42 of this geometrical design, the uniformity in the speed at which the light beam moves across the medium to be scanned can be improved without changing the scan width.

Since the deflecting action is not particularly necessary on the optical axis, $\theta_{44} = \theta_{44}' = 0$.

Figure 1:
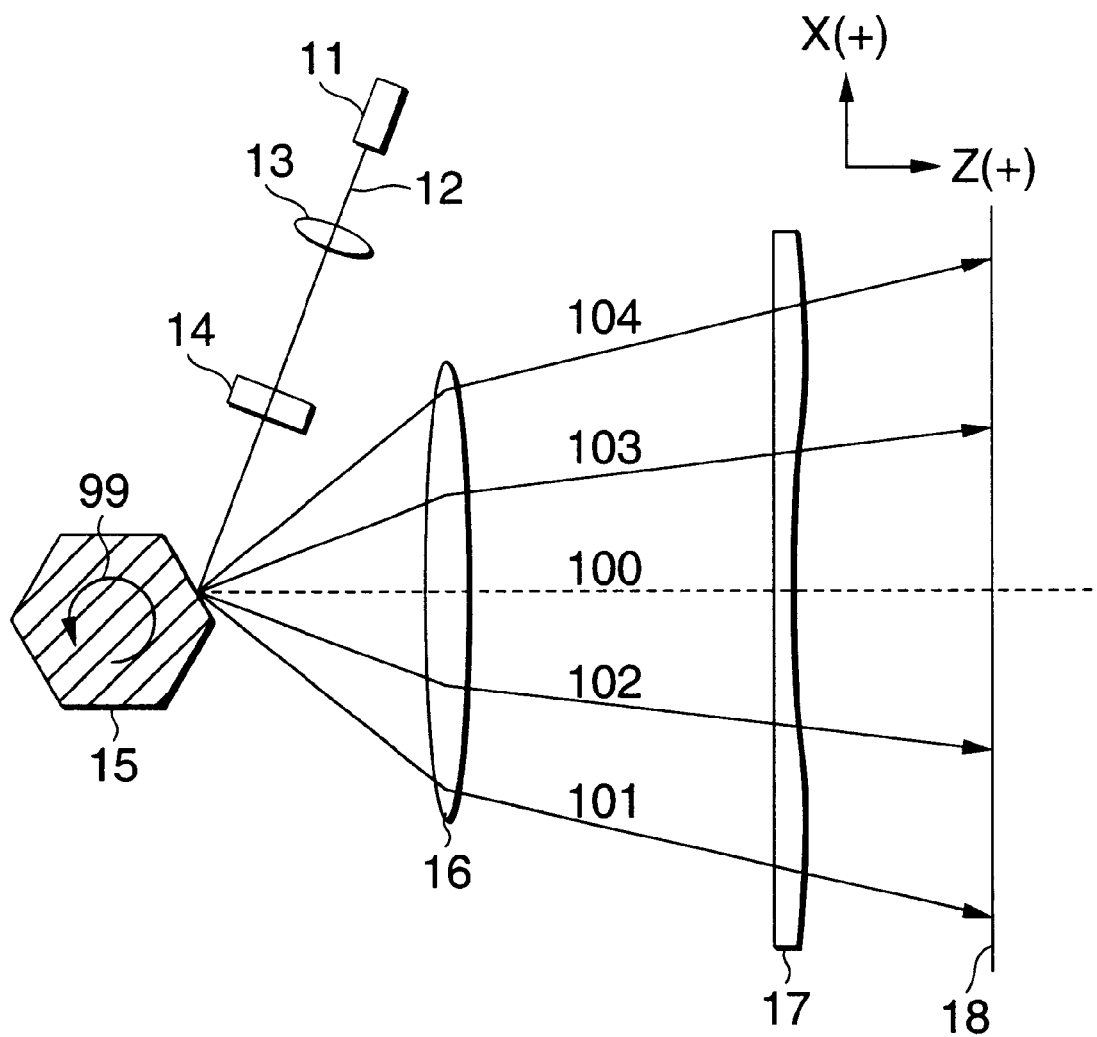
FIG. 1 a schematic of an optical scanner according to an embodiment of the invention.
Figure 2:
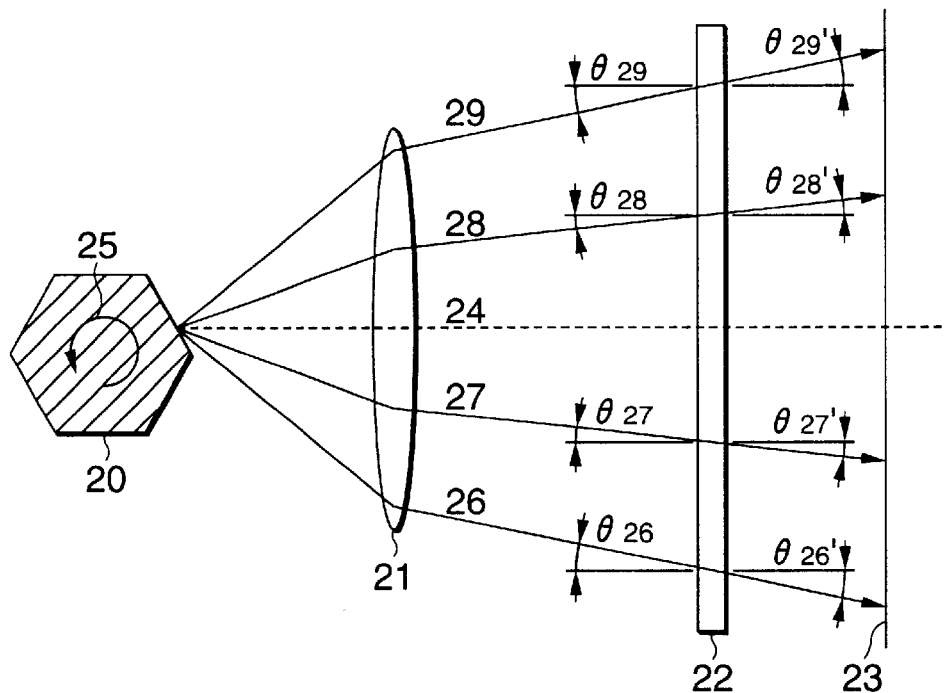
FIG. 2 is a schematic of the scanning lens optics in a prior art optical scanner.
Figure 3:
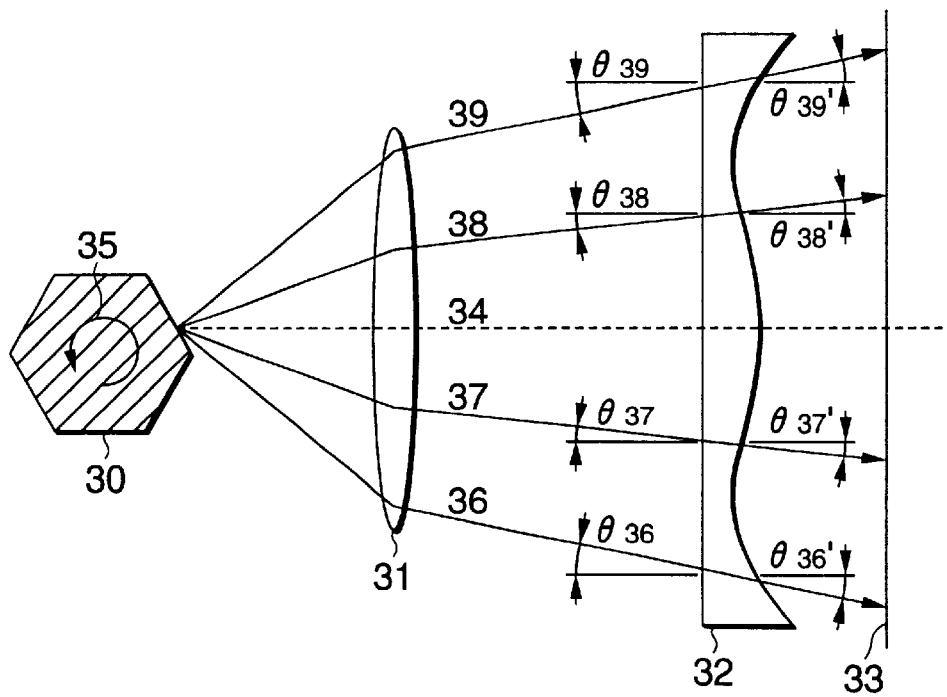
FIG. 3 a schematic of the scanning lens optics in another prior art optical scanner.

Reference should now be made to FIG. 1 which is a schematic of an optical scanner according to the embodiment under consideration. It comprises a semiconductor laser 11 as a light source which issues a light beam of which the principal ray is indicated by 12, a collimator lens 13, a cylindrical lens 14 having power only in the direction perpendicular to the main scanning direction, a rotating polygonal mirror 15 as a light deflecting means, and two lens elements 16 and 17 as scanning lens optics, the lens element 17 being an elongated cylindrical lens having power in both the main scanning direction and the direction perpendicular to it.

Indicated by 18 is the surface of a photoreceptor as the medium to be scanned; 99 is an arrow indicating the direction in which the polygonal mirror 15 rotates; 100 is the optical axis of the scanning lens optics; 101 is the principal ray of a light beam at the scan start end; 102 and 103 are the principal rays of a light beam within the scan region; and 104 is the principal ray of a light beam at the scan finishing end.

The designs of the scanning lens elements 16 and 17 are described below. If the main scanning direction, the direction perpendicular to it and the axial direction are designated by X, Y and Z, respectively, the geometrical shape of each lens face is given by:

$$Z = f_0(X,Y) = f_2(X,Y) \qquad (5)$$

where $f_0(X,Y)$ represents a basic toric shape and $f_2(X,Y)$ represents an addition function which is not of rotation symmetry. A cross section in plane X-Z of a local coordinate system in which each face crosses the optical axis at the origin is expressed by the following equation (6) and symmetrical with respect to the axis that is in plane X-Z, parallel to the X axis and located at distance r from the origin as measured along the Z axis:

$$f_0(X,Y) = (X^2/R)/(1+SQRT(1-(K+1)(X/R)^2)) + dX^4 + eX^6 \qquad (6)$$

where d, e and K are constants, with K being designated a conicity constant. A cross section in plane Y-Z is a circle with a radius of curvature r. In equation (6), $f_2(X,Y)$ is expressed by:

$$f_2(X,Y) = a_{07}X^3 + a_{09}XY^2 + a_{11}X^4 + a_{13}X^2Y^2 + a_{15}Y^4 + a_{16}X^5 + a_{18}X^3Y^2 + a_{22}X^6 + a_{24}X^4Y^2 + a_{29}X^7 + a_{37}X^8 \qquad (7)$$

where $a_{1m}$ is a constant.

Tables 1–3 show the specifications of the scanning lens optics. The respective symbols in the tables have the following definitions: A, a reflecting face of the rotating polygonal mirror 15; B, the face of the scanning lens 16 which is directed to the rotating polygonal mirror; C, the face of the scanning lens 16 which is directed to the photoreceptor drum; D, the face of the scanning lens 17 which is directed to the rotating polygonal mirror; E, the face of the scanning lens 17 which is directed to the photoreceptor drum; F, the photoreceptor drum's surface 18; R, the radius of curvature on the optical axis 100 in the main scanning direction; r, the radius of curvature on the optical axis 100 in the direction perpendicular to the main scanning direction; th, the distance between adjacent lens faces; n, refractive index.

TABLE 1

| Face No. | R | r | K | d | e | th | n |
|---|---|---|---|---|---|---|---|
| A | ∞ | | 0 | 0 | 0 | 91.0 | 1.0 |
| B | 980 | 830 | 0 | 0 | 0 | 24.5 | 1.498 |
| C | −148.8 | −52.7 | −7.2 × 10⁻¹ | 0 | 0 | 189.3 | 1.0 |
| D | ∞ | 100 | 0 | 0 | 0 | 7.0 | 1.498 |
| E | 8420 | −100 | 0 | −3.5 × 10⁻⁹ | 6 × 10⁻¹⁴ | 92.3 | 1.0 |
| F | ∞ | | | | | | |

TABLE 2

| Face No. | Coefficients in Addition Function |
|---|---|
| B | $a_{11} = -7 \times 10^{-10}$ |
|   | $a_{13} = -1 \times 10^{-8}$ |
| C | $a_{07} = 7.3 \times 10^{-8}$ |
|   | $a_{09} = 6.1 \times 10^{-7}$ |
|   | $a_{13} = 7.4 \times 10^{-7}$ |
|   | $a_{15} = 1.3 \times 10^{-6}$ |
|   | $a_{16} = -8.0 \times 10^{-12}$ |
|   | $a_{18} = -3.6 \times 10^{-10}$ |
|   | $a_{22} = 5.0 \times 10^{-14}$ |
|   | $a_{24} = 7.0 \times 10^{-11}$ |
|   | $a_{29} = 2.0 \times 10^{-16}$ |
|   | $a_{37} = 2.8 \times 10^{-17}$ |

TABLE 3

| P | $3.83 \times 10^{-3}$ |
|---|---|
| $P_{10}$ | 0 |
| $P_{20}$ | $-5.91 \times 10^{-5}$ |

Figure 5:
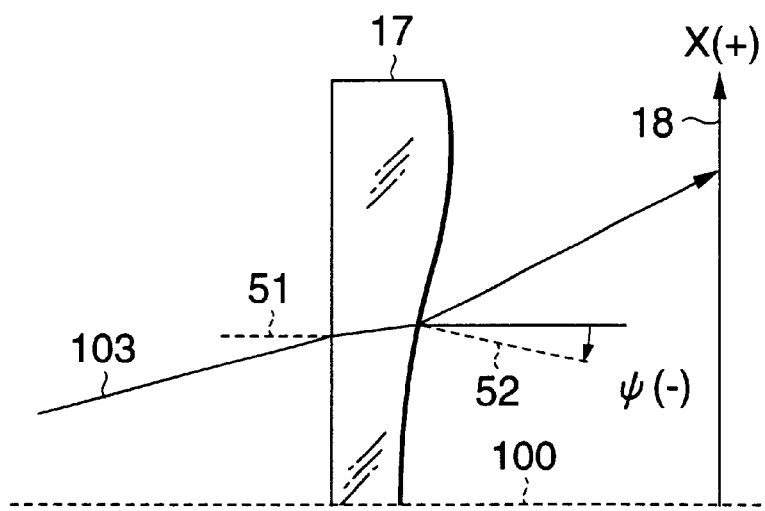
FIG. 5 a schematic of two lines dropped normal to opposite faces of an elongated lens element.

FIG. 5 is a partial section of the elongated lens 17 and the photoreceptor drum's surface 18. Indicated by 51 is the line dropped normal to the face of the scanning lens 17 which is directed to the rotating polygonal mirror, and 52 is the line dropped normal to the face of the same scanning lens which is directed to the photoreceptor.

Figure 6:
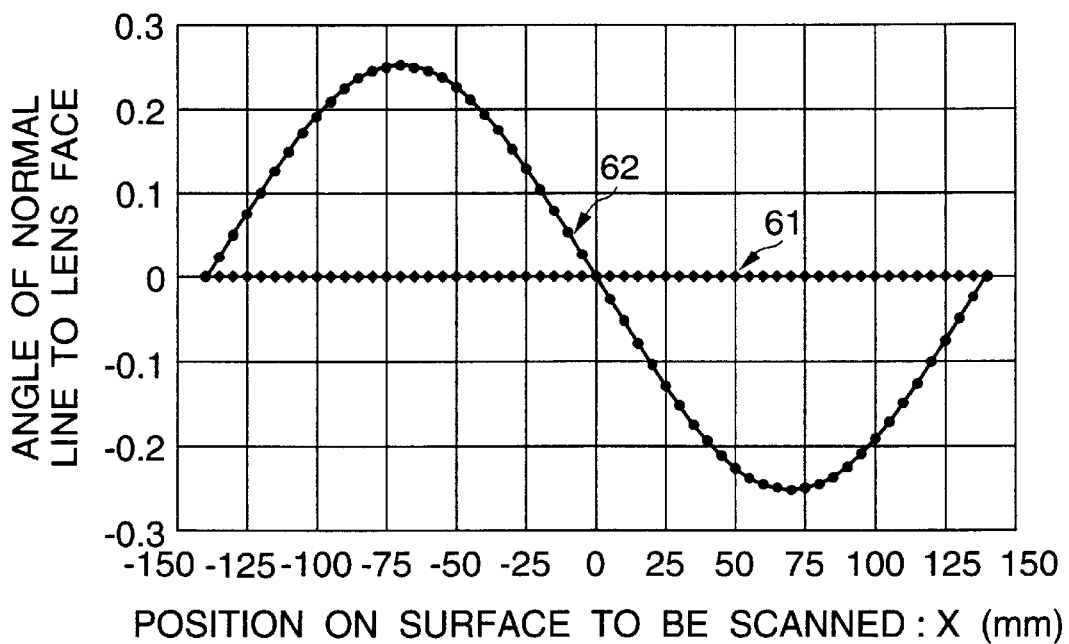
FIG. 6 graph showing the angle at which the optical axis forms with the line dropped normal to each face of an elongated lens element.

FIG. 6 is a graph showing the relationship between the position of a ray on the photoreceptor's surface 18 and the angle ψ the optical axis forms both with the line dropped normal to the face of the elongated lens 17 which is directed to the rotating polygonal mirror 15 and with the line dropped normal to the face of the same lens which is directed to the photoreceptor's surface. In the graph, 61 refers to the data for the line dropped normal to the face of the elongated lens 17 which is directed to the rotating polygonal mirror, and 62 the data for the line dropped normal to the face of the same lens which is directed to the photoreceptor. In the embodiment under consideration, the face of the elongated lens 17 which is directed to the rotating polygonal mirror is cylindrical, so ψ=0 irrespective of which value is taken by X. On the other hand, ψ for the line dropped normal to the face of the elongated lens 17 which is directed to the photoreceptor is zero near the scan start end (X=−140 mm), the optical axis (X=0 mm) and the scan finishing end (X=+140 mm). Hence, the entrance face of the elongated lens 17 is generally parallel to the exit face at the scan start end, on the optical axis and at the scan finishing end and the rays of light incident in these positions are not subject to any deflecting action.

Figure 7:
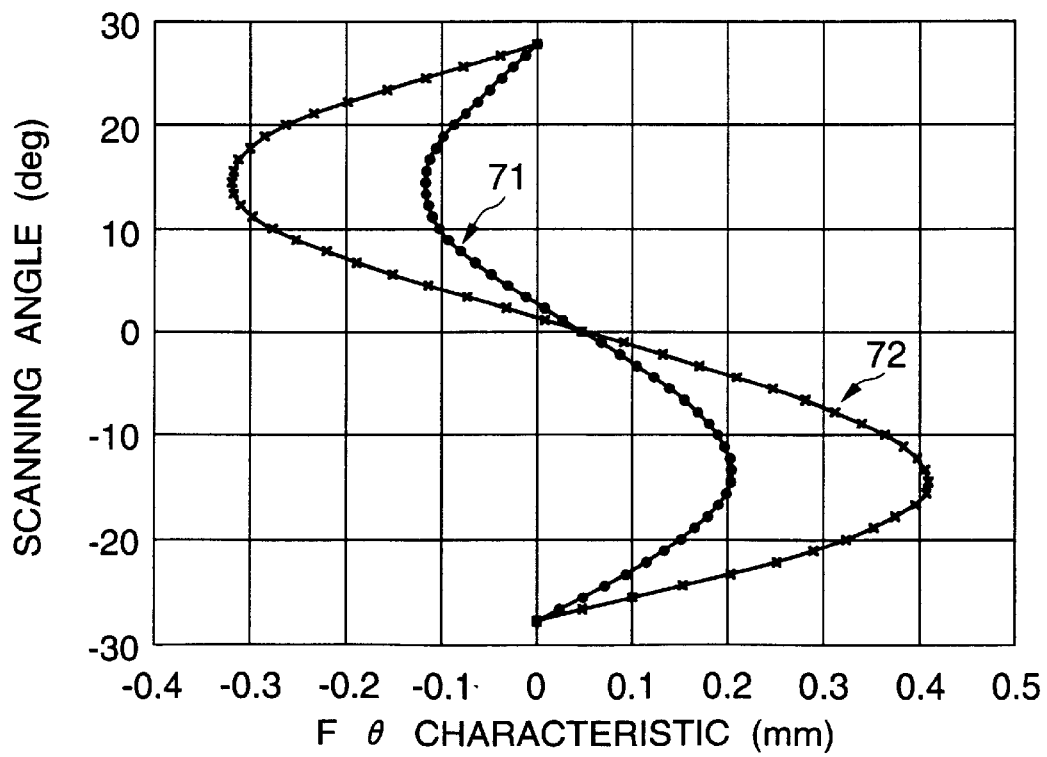
FIG. 7 is a graph showing the Fθ characteristic.

FIG. 7 is a graph showing the Fθ characteristic of an elongated lens, or the uniformity in the speed at which a light beam moves across the medium to be scanned. In the graph, curve 71 refers to the data for the embodiment under consideration and curve 72 to the data for the prior art case of using an elongated cylindrical lens having no power in the main scanning direction. The Fθ characteristic for each curve is substantially zero at ±27 degrees which correspond to the scan start and finishing ends, respectively, and this means that the elongated lens 17 causes little change in the scan width. The Fθ characteristic for curve 72 reaches a maximum of 0.4 mm at a scanning angle of about −14 degrees but the maximum value for curve 71 is reduced to about 0.2 mm.

Figure 8:
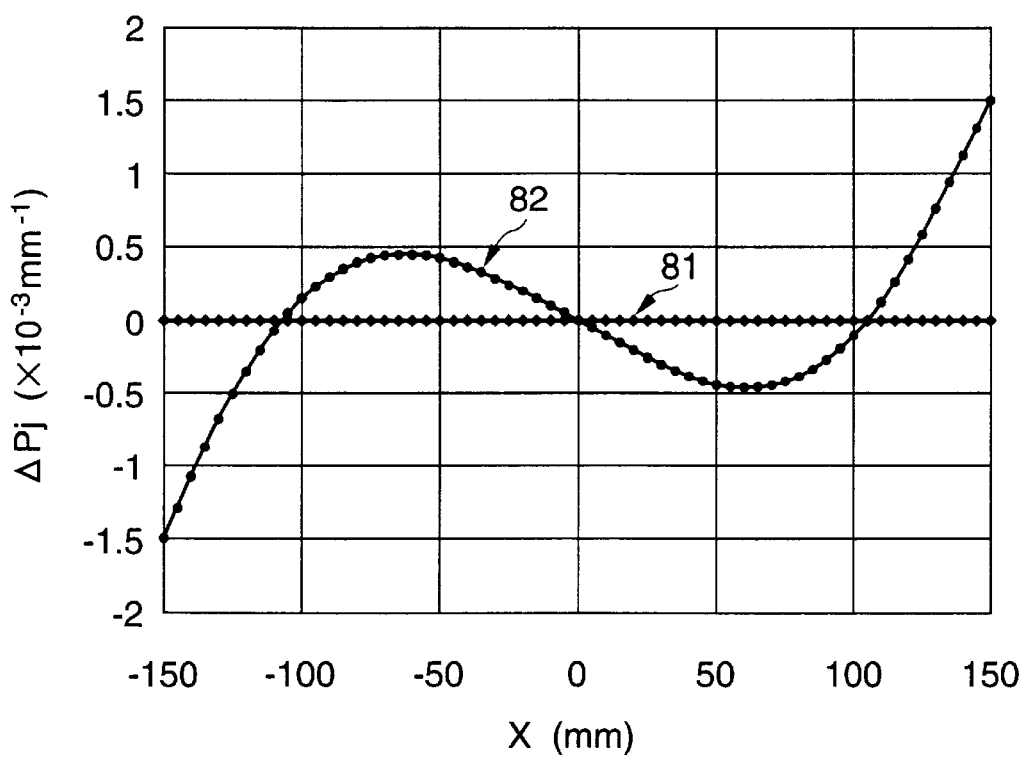
FIG. 8 is graph showing the change in lens power in the main scanning direction.

FIG. 8 is a graph showing ΔPj vs. position X in the main scanning direction. Symbol ΔPj represents the normalized value of a change in Pj(X), or the power in the main scanning direction of the face of the elongated lens 17 which is directed to the rotating polygonal mirror 15 or the face of the same lens which is directed to the photoreceptor 18, and is defined by:

$$\Delta Pj = (1/P)|dPj(X)/dx| \quad (8)$$

In the graph, line 81 refers to the data for j=1, or the face of the elongated lens 17 which is directed to the rotating polygonal mirror, and curve 82 refers to the data for j=2, or the face of the same lens which is directed to the photoreceptor. A reasonable small value of ΔPj means that the power in the main scanning direction is generally constant irrespective of the position in the same direction and, hence, the change that occurs in the curvature of field in the main scanning direction depending upon whether the elongated lens 17 is used or not is reasonably small and so is the change in the curvature of field in the main scanning direction that results from a positional offset of the same lens in the main scanning direction.

Figure 9:
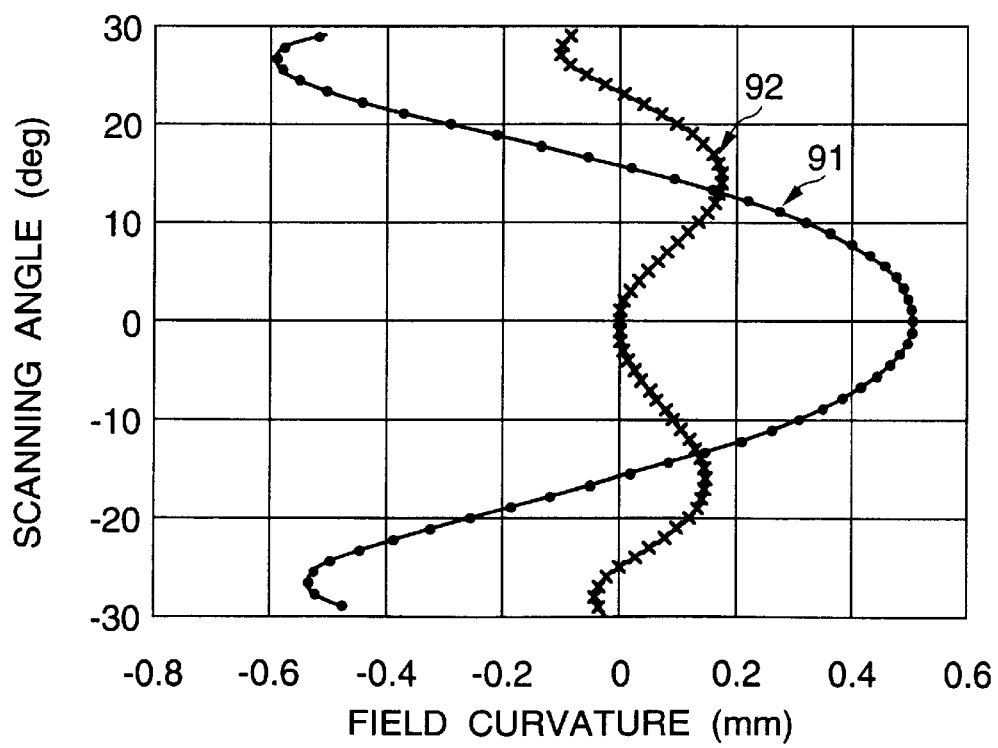
FIG. 9 is a graph showing the curvature of field for two types of elongated lens element.

FIG. 9 is a graph showing the curvature of field in the main scanning direction as a function of scanning angle. In the graph, curve 91 refers to the data for the embodiment under consideration and curve 92 to the data for the prior art case of using an elongated cylindrical lens having no power in the main scanning direction. The elongated lens 17 used in the embodiment of the invention produces a greater curvature of field than the prior art cylindrical lens but it is within ± 0.6 mm and has no problem in view of the depth of focus.

The following conditions (9) and (10) are necessary for ensuring that the change in the composite power of the scanning lens optics that occurs depending upon whether the elongated lens 17 is used or not is kept at a level that causes no problem, and the following conditions (11) and (12) are necessary for ensuring that the curvature of field that occurs in the main scanning direction is kept at an insignificant level:

$$|P_{10}/P| < 0.02 \quad (9)$$

$$|P_{20}/P| < 0.02 \quad (10)$$

$$|dP_1(X)/dX|(1/P) < 0.002 \text{ mm}^{-1} \quad (11)$$

$$|dP_2(X)/dX|(1/P) < 0.002 \text{ mm}^{-1} \quad (12)$$

If conditions (11) and (12) are satisfied, the power in the direction perpendicular to the main scanning direction is generally constant irrespective of the position in the main scanning direction and, as a result, one can realize an optical system that is immune to the possible effects of a positional offset of the elongated lens in the main scanning direction, in particular, those which can be a problem in the case where the elongated lens is made of a plastic material, namely, the variation in percent shrinkage during molding and expansion or shrinkage due to the change in ambient temperature.

The foregoing embodiment centers on the discussion of the relationship between the deflecting action of the elongated lens and its Fθ characteristic. In practice, the thickness of the elongated lens also affects the Fθ characteristic and must be taken into account in optimization of the lens.

As described on the foregoing pages, the present invention has the advantage of improving the uniformity in scanning speed without changing the printing width and, hence, there is provided an optical scanner that is compatible with higher dot density in recording media.

What is claimed is:

1. An optical scanner comprising:

light deflector which scans by deflecting a light beam from a light source; and scanning lens optics for focusing the deflected light beam on a medium to be scanned;

wherein said scanning lens optics includes more than one lens element, the angle of the line dropped normal to a first face of the lens element positioned the closest to the medium to be scanned which is directed to said light deflecting means at the point where the principal ray of a light beam incident at the scan start end crosses said first face is generally equal to the angle of the line dropped normal to the second face of said lens element which is directed to the medium to be scanned at the point where said principal ray crosses said second face, and the angle of the line dropped normal to said first face at the point where the principal ray of a light beam incident at the scan finishing end crosses said first face is generally equal to the angle of the line dropped normal to said second face at the point where said principal ray crosses said second face;

wherein $|P_{10}/P|<0.02$ and $|P_{20}/P|<0.02$ where $P_{10}$ is the axial power of said first lens face in the main scanning direction, $P_{20}$ is the axial power of said second lens face in the main scanning direction, and P is the axial power of the scanning optics in the main scanning direction.

2. An optical scanner comprising:

light deflector which scans by deflecting a light beam from a light source; and scanning lens optics for focusing the deflected light beam on a medium to be scanned;

wherein said scanning lens optics includes more than one lens element, the angle of the line dropped normal to a first face of the lens element positioned the closest to the medium to be scanned which is directed to said light deflecting means at the point where the principal ray of a light beam incident at the scan start end crosses said first face is generally equal to the angle of the line dropped normal to the second face of said lens element which is directed to the medium to be scanned at the point where said principal ray crosses said second face, and the angle of the line dropped normal to said first face at the point where the principal ray of a light beam incident at the scan finishing, end crosses said first face is generally equal to the angle of the line dropped normal to said second rid face at the point where said principal ray crosses said second face; wherein $|dP_1(X)/dX|(1/P)<0.002 \text{ mm}^{-1}$ and $|dP_2(X)/dX|(1/P)<0.002 \text{ mm}^{-1}$ where $P_1(X)$ is the power the face of said lens positioned the closest to the medium to be scanned which is directed to the light deflecting means has in the main scanning direction at distance X from the optical axis, and $P_2(X)$ is the power the face of the same lens which is directed to the medium to be scanned has in the main scanning direction at distance X from the optical axis.

3. An optical scanner comprising:

light deflector which scans by deflecting a light beam from a light source; and scanning lens optics for focusing the deflected light beam on a medium to be scanned;

wherein said scanning lens optics includes more than one lens element, the angle of the line dropped normal to a first face of the lens element positioned the closest to the medium to be scanned which is directed to said light deflecting means at the point where the principal ray of a light beam incident at the scan start end crosses said first face is generally equal to the angle of the line dropped normal to the second face of said lens element which is directed to the medium to be scanned at the point where said principal ray crosses said second face, and the angle of the line dropped normal to said first face at the point where the principal ray of a light beam incident at the scan finishing end crosses said first face is generally equal to the angle of the line dropped normal to said second face at the point where said principal ray crosses said second face;

said lens element closest to the medium to be scanned having a midsection between said scan start end and said scan finishing end, said midsection ensuring deflection at a point within said midsection such that the angle of the line dropped normal to said first face at said point within said midsection is not equal to the angle of the line dropped normal to the second face of said lens element closest to the medium to be scanned at said point.

4. The optical scanner according to claim 3, wherein said lens element positioned the closest to the medium to be scanned has a generally constant power in a direction normal to the main scanning direction irrespective of the position in the main scanning direction.

5. The optical scanner according to claim 3, wherein said lens element positioned the closest to the medium to be scanned is made of a plastic material.

* * * * *